(12) United States Patent  
Kobayashi et al.

(10) Patent No.: US 9,151,906 B2
(45) Date of Patent: Oct. 6, 2015

(54) FERRULE FIXING MEMBER AND FERRULE HOLDING STRUCTURE

(71) Applicant: Hitachi Metals, Ltd., Tokyo (JP)

(72) Inventors: Takumi Kobayashi, Hitachi (JP); Kouki Hirano, Hitachinaka (JP); Hiroki Yasuda, Mito (JP); Yoshiaki Ishigami, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/252,840

(22) Filed: Apr. 15, 2014

(65) Prior Publication Data

US 2014/0328559 A1 Nov. 6, 2014

(30) Foreign Application Priority Data

May 1, 2013 (JP) .................. 2013-096237

(51) Int. Cl.
G02B 6/38 (2006.01)
G02B 6/42 (2006.01)

(52) U.S. Cl.
CPC ............ *G02B 6/3893* (2013.01); *G02B 6/3821* (2013.01); *G02B 6/4292* (2013.01)

(58) Field of Classification Search
None
See application file for complete search history.

(56) References Cited

U.S. PATENT DOCUMENTS

2010/0008630 A1 1/2010 Marrapode et al.

*Primary Examiner* — Jerry Rahll
(74) *Attorney, Agent, or Firm* — Roberts Mlotkowski Safran & Cole P.C.

(57) ABSTRACT

A ferrule fixing member for fixing a ferrule to a holding member with a holding hole into which the ferrule is inserted. The ferrule fixing member includes a first plate part and a second plate part configured to face each other while sandwiching an resilient member arranged on an outer periphery of the ferrule in a radial direction thereof, a pressing part configured to press the resilient member such that the ferrule is pressed against a bottom side of the holding hole by a resilient force of the resilient member, a locked part configured to be engaged with a locking part formed in the holding member, and an extending part configured to extend from the second plate part to the locked part. The locking of the locked part and the locking part is released by moving the first plate part and the second plate part close to each other.

5 Claims, 7 Drawing Sheets

FERRULE FIXING MEMBER AND FERRULE HOLDING STRUCTURE

The present application is based on Japanese patent application No. 2013-096237 filed on May 1, 2013, the entire contents of which are incorporated herein by reference.

BACKGROUND OF THE INVENTION

1. Field of the Invention

This invention relates to a ferrule fixing member configured to fix a ferrule for holding an optical fiber to a holding member, and a ferrule holding structure.

2. Description of the Related Art

An optical transceiver is known that is configured to include Transmitter Optical Sub-Assembly (TOSA) or Receiver Optical Sub-Assembly (ROSA) and to communicate by using an optical fiber held by a ferrule fixed to the optical sub-assembly as a signal transmission medium (e.g., refer to JP-A-2009-514038).

The optical transceiver disclosed in JP-A-2009-514038 is provided with a locking mechanism for fixing the ferrule to prevent the removal of the ferrule from the optical sub-assembly. The locking mechanism is configured to include a pair of clips extending along the longitudinal direction of the ferrule, a bridge part configured to connect the pair of clips in the center part thereof, a front stop ring fixed to the ferrule, and a spring having a coil-like shape arranged between the bridge part and the front stop ring. In addition, the movement of the spring and bridge part along the longitudinal direction of the ferrule is regulated by the locking mechanism that functions as a rear stop ring.

The pair of the clips is composed of an L-type finger which is disposed in an end part of the optical sub-assembly side, and a finger lever which is disposed in an end part on the side opposite to the L-type finger. The pair of the clips swings with a focus on the bridge part by that the finger lever is grasped so that the L-type finger is expanded. On the other hand, in the optical sub-assembly, an annular collar configured to lock with the L-type finger is disposed.

When the ferrule is mounted in the optical subassembly by a user, the finger lever of the pair of clips is grasped so as to allow the clips to swing, and the L-type finger of the respective clips is expanded so as to be arranged in the outer periphery part of the collar. In addition, the finger lever is released, thereby the L-type finger is engaged with the collar of the optical subassembly. Thereby, the ferrule is fixed to the optical subassembly.

SUMMARY OF THE INVENTION

The locking mechanism disclosed in JP-A-2009-514038 is configured such that the finger lever extends to the opposite side of the L-type finger than the bridge part along the optical fiber. Consequently, the length of the locking mechanism in the longitudinal direction along the optical fiber is increased due to the length of the pair of clips including the finger lever.

It is an object of the invention to provide a ferrule fixing member and a ferrule holding structure that can be significantly downsized.

(1) According to one embodiment of the invention, a ferrule fixing member for fixing a ferrule to hold an optical fiber to a holding member with a holding hole into which the ferrule is inserted comprises:

a first plate part and a second plate part configured to face each other while sandwiching an resilient member arranged on an outer periphery of the ferrule in a radial direction thereof;

a pressing part configured to press the resilient member such that the ferrule is pressed against a bottom side of the holding hole by a resilient force of the resilient member;

a locked part configured to be engaged with a locking part formed in the holding member; and an extending part configured to extend from the second plate part to the locked part, wherein the locking of the locked part and the locking part is released by moving the first plate part and the second plate part close to each other.

(2) According to another embodiment of the invention, a ferrule holding structure comprises:

the abovementioned ferrule fixing member; and the resilient member, wherein the resilient member is compressed along the longitudinal direction of the ferrule when the locked part of the ferrule fixing member is engaged with the locking part of the holding member, and the ferrule is held by the holding member by the resilient force of the resilient member compressed.

EFFECTS OF THE INVENTION

According to one embodiment of the invention, a ferrule fixing member and a ferrule holding structure can be provided that can be significantly downsized.

BRIEF DESCRIPTION OF THE DRAWINGS

The preferred embodiments according to the invention will be explained below referring to the drawings, wherein:

FIGS. 5A to 5D are explanatory views schematically showing a process for fixing the ferrule to the optical subassembly, wherein

FIGS. 7A and 7B are explanatory views schematically showing an operation for removing the ferrule fixing member from the optical subassembly, wherein

DETAILED DESCRIPTION OF THE PREFERRED EMBODIMENTS

[Embodiment]

Figure 1:
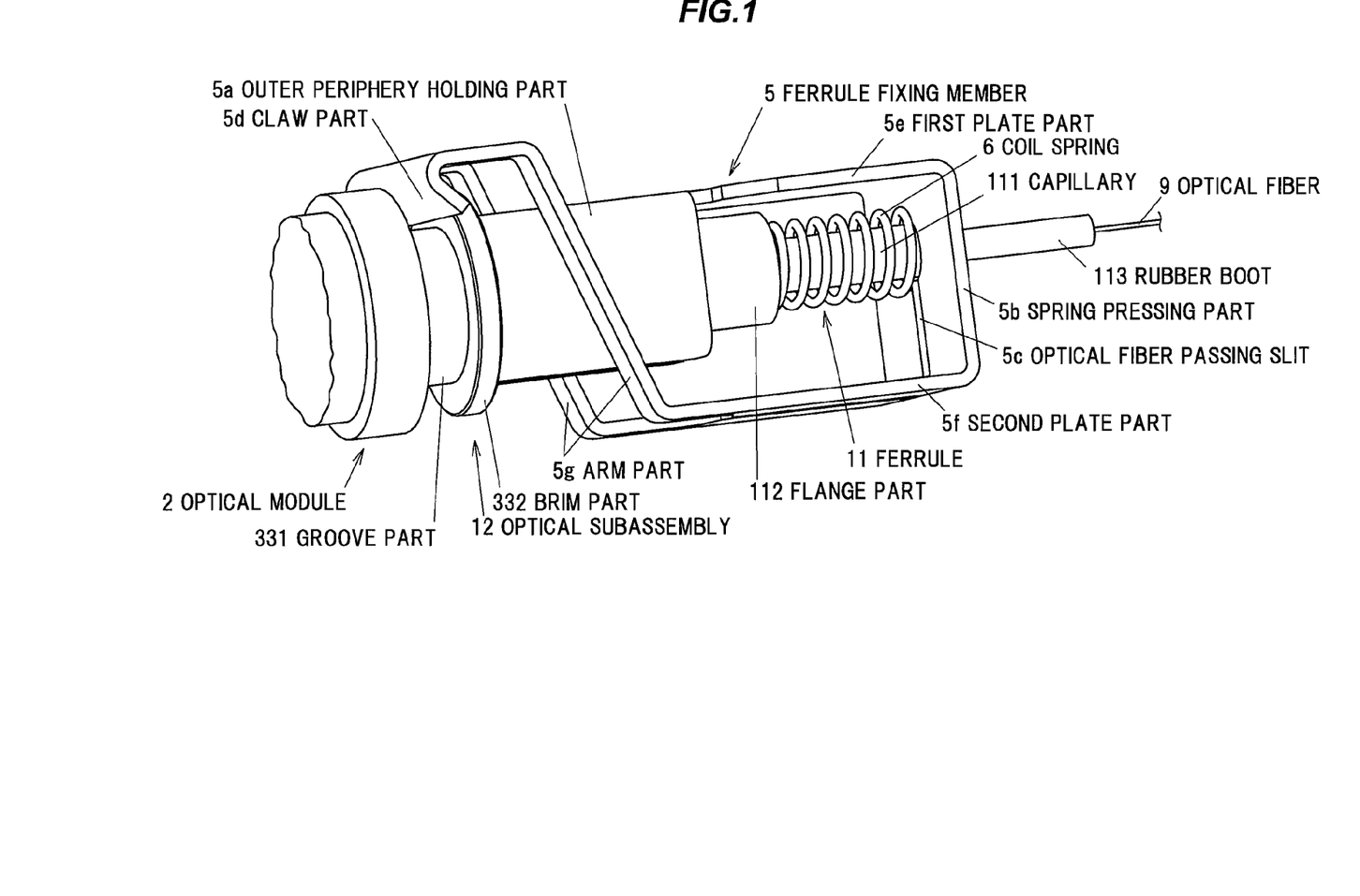
FIG. 1 is a perspective view schematically showing a ferrule fixing member according to one embodiment of the invention, and an optical subassembly and a ferrule that are fixed by the ferrule fixing member.
Figure 2:
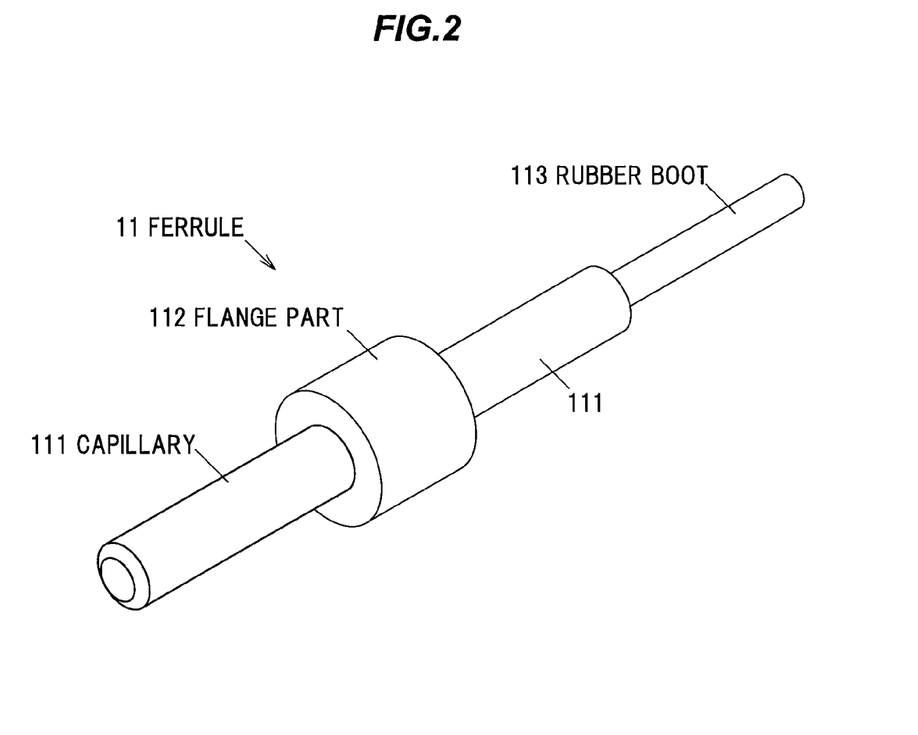
FIG. 2 is a perspective view schematically showing a configuration example of the ferrule.
Figure 3:
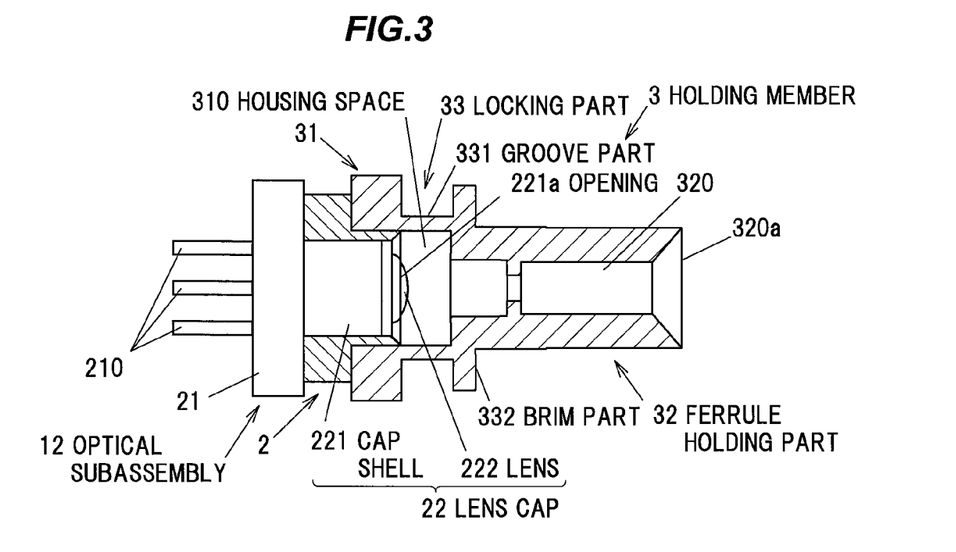
FIG. 3 is a cross-sectional view schematically showing the optical subassembly.

FIG. 1 is a perspective view schematically showing the whole configuration of a ferrule fixing member 5 according to the embodiment of the invention and a ferrule 11 and an optical subassembly 12 that are fixed by the ferrule fixing member 5. FIG. 2 is a perspective view schematically showing a configuration example of the ferrule 11. FIG. 3 is a cross-sectional view schematically showing a configuration example of the optical subassembly 12.

The ferrule fixing member 5 according to the embodiment is configured to fix the ferrule 11 for holding an optical fiber 9 to a holding member 3 where a holding hole 320 (shown in FIG. 3) into which the ferrule 11 is inserted is formed. As shown in FIG. 2, the ferrule 11 integrally includes a capillary 111 having a cylindrical shape configured to hold the optical fiber 9, and a flange part 112 formed to outwardly protrude from the capillary 111. The flange part 112 has a width of for example, 1.8 mm in the extension direction. The optical fiber 9 is drawn out from the ferrule 11 along a rubber boot 113 mounted in the ferrule 11.

As the optical subassembly 12, Transmitter Optical Sub-Assembly (TOSA) or Receiver Optical Sub-Assembly (ROSA) can be adopted.

The Transmitter Optical Sub-Assembly (TOSA) includes, for example, a light emitting element such as Laser Diode (LD), Vertical Cavity Surface Emitting Laser (VCSEL), and converts an electrical signal transmitted from the other electronic components mounted on a circuit board on which the Transmitter Optical Sub-Assembly (TOSA) is mounted to an optical signal so as to emit a light toward the optical fiber 9.

On the other hand, the Receiver Optical Sub-Assembly (ROSA) includes, for example, a light receiving element such as Photo Diode (PD), makes a light propagating through the optical fiber 9 incident and converts an optical signal to an electrical signal so as to transmit the electrical signal to the other electronic components mounted on a circuit board on which the Receiver Optical Sub-Assembly (ROSA) is mounted.

Hereinafter, a configuration that the Receiver Optical Sub-Assembly (ROSA) is used as the optical subassembly 12 will be more concretely explained.

As shown in FIG. 3, the optical subassembly 12 includes an optical module 2 having the above-mentioned light receiving element and a holding member 3 having a ferrule holding part 32 in which the holding hole 320 is formed.

The ferrule fixing member 5 integrally includes an outer periphery holding part 5a as a cylindrical part located in the outer periphery of the ferrule holding part 32 and a spring pressing part 5b as a pressing part configured to press the ferrule 11 such that the ferrule 11 is pressed in a deeper side of the holding hole 320 (in a side of the optical module 2) by resilient force of a coil spring 6 as an resilient member. In the embodiment, the outer periphery holding part 5a is formed like a quadrangular cross-section cylinder configured to house at least a part of the ferrule holding part 32, but not limited to this, it can be also formed like a circular cross-section cylinder. Detail of the ferrule fixing member 5 will be explained later.

The flange part 112 of the ferrule 11 is pressed in a deeper side of the holding hole 320 by the coil spring 6 that abuts the spring pressing part 5b of the ferrule fixing member 5 so as to be compressed, thereby the flange part 112 comes contact into with the opening end surface 320a of the holding hole 320. As the coil spring 6, one comprised of metal or resin is appropriately selected according to a pressing load required. Further, as this resilient member, an elastically deforming material such as a plate spring or a rubber material can be also used instead of the coil spring.

(Configuration of Optical Subassembly 12)

As shown in FIG. 3, the optical subassembly 12 is constituted of a combination of the optical module 2 having the above-mentioned light receiving element and the holding member 3 having the ferrule holding part 32 configured to hold the ferrule 11. The optical module 2 has a stem 21 configured to house the light receiving element and the lens cap 22. The stem constitutes a CAN package together with the lens cap 22. The stem 21 is electrically connected to a circuit board (not shown) on which the optical subassembly 12 is mounted by a plurality (four in the embodiment and three thereof are shown in FIG. 3) of lead pins 210. In the embodiment, the light emitted from the optical fiber 9 is converged by a lens 222 so as to enter the light receiving element and be converted from an optical signal to an electrical signal in the light receiving element. This electrical signal is transmitted to the other electronic components mounted on the circuit board via the plurality of the lead pins 210.

The lens cap 22 has the lens 222 configured to converge a light propagating through the optical fiber 9 and a cap shell 221 configured to hold the lens 222. The cap shell 221 is composed of, for example, a conductive material such as Fe—Ni alloy, stainless steel and has an opening 221a in the center of the end part on the side opposite to the stem 21. The lens 222 is, for example, a ball lens comprised of an optical glass, and is fixed to the opening 221a of the cap shell 221 in a state of being glass-sealed by using a low melting point glass or the like.

The holding member 3 integrally includes the module housing part 31 in which a housing space 310 configured to house the optical module 2 is formed, the ferrule holding part 32 as the cylindrical part in which the holding hole 320 is formed, into which the ferrule 11 is inserted, and the locking part 33 arranged between the module housing part 31 and the ferrule holding part 32. The module housing part 31, the ferrule holding part 32 and the locking part 33 are formed in a cylindrical shape respectively. The ferrule holding part 32 has a length of, for example, 5.15 mm in the insertion direction of the ferrule 11.

The locking part 33 is configured such that a groove part 331 configured to house a claw part 5d of the ferrule fixing member 5 explained later, and a brim part 332 configured to regulate an outer periphery holding part 5a to move in the insertion direction of the ferrule 11, and configured to lock the claw part 5d are formed on the outer periphery. The brim part 332 is formed so as to outwardly protrude from the ferrule holding part 32, and has a thickness of, for example, 0.55 mm in the insertion direction of the ferrule 11.

(Configuration of Ferrule Fixing Member 5)

Figure 4:
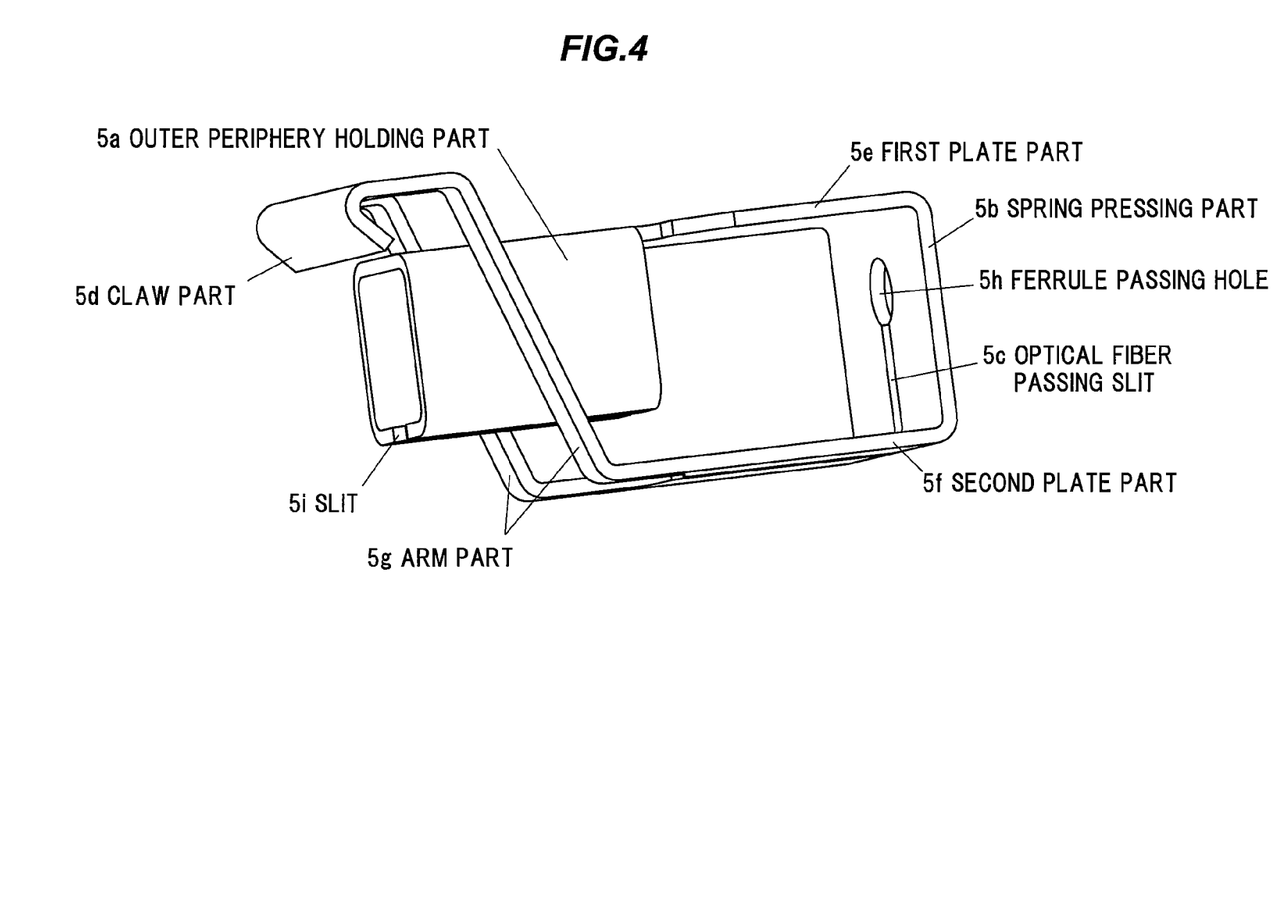
FIG. 4 is a perspective view schematically showing a configuration example of the ferrule fixing member according to the embodiment of the invention.

FIG. 4 is a perspective view schematically showing a configuration example of the ferrule fixing member 5 according to the embodiment of the invention.

The ferrule fixing member 5 is formed by bending a plate-like material of single plate that is punched out in a predetermined shape. As a material of the plate-like material, for example, a high tensile strength material such as stainless steel, phosphor bronze can be preferably used.

The ferrule fixing member 5 includes the outer periphery holding part 5a configured to be mounted on the outer periphery of the ferrule holding part 32, the spring pressing part 5b configured to press the coil spring 6 such that the ferrule 11 is pressed in a deeper side of the holding hole 320 (in a side of the optical module 2) by resilient force of the coil spring 6, the first plate part 5e and the second plate part 5f configured to face each other while sandwiching the coil spring 6 arranged in the outer periphery side of the ferrule 11 in the radial direction thereof the claw part 5d as the locked part configured to be locked with the locking part 33 formed in the optical subassembly 12, and a pair of arm parts 5g as the extending part configured to extend between the second plate part 5f and the claw part 5d.

The outer periphery holding part 5a is configured to hold the ferrule holding part 32 and be extended in the insertion direction of the ferrule 11. The first plate part 5e is formed between one end part of the outer periphery holding part 5a and the spring pressing part 5b.

In addition, the first plate part 5e is configured to extend so as to be bent at an approximately right angle from the base end part of the spring pressing part 5b toward the side of the outer periphery holding part 5a and the second plate part 5f is configured to extend so as to be parallel to the first plate part 5e from the end part of the spring pressing part 5b. Namely, the spring pressing part 5b is formed so as to connect between the end parts of the first plate part 5e and the second plate part 5f on the opposite side to the holding hole 320 in the longitudinal direction of the ferrule 11. The first plate part 5e and the second plate part 5f are configured to be formed in a rectangular shape and be approximately parallel to the insertion direction of the ferrule 11 in the longitudinal direction thereof.

In the outer periphery holding part 5a, a slit 5i of a belt-like shape is formed, the slit 5i being configured to allow the optical fiber 9 to pass through when assembled. In the spring pressing part 5b, a ferrule passing hole 5h is formed as an insertion through hole into which the ferrule 11 is inserted. In addition, in the spring pressing part 5b and the second plate part 5f, similarly to the slit 5i, an optical fiber passing slit 5c of a belt-like shape through which the optical fiber 9 is passed is formed so as to be communicated with the ferrule passing hole 5h and be parallel to the slit 5i.

The claw part 5d is configured to be bent in the tip thereof at an angle of not less than 90 degrees (for example, 120 to 150 degrees) and to be housed in the groove part 331 formed of the locking part 33 shown in FIG. 3 so as to be engaged with the brim part 332. The tip of the claw part 5d is pressed to the side surface of the brim part 332 in the side of the groove part 331 by that the spring pressing part 5b receives reaction force of the coil spring 6. In addition, the claw part 5d is configured to connect the end parts of a pair of the arm parts 5g (the end parts on the opposite side to the base end part in the side of the second plate part 5f) to each other.

A pair of the arm parts 5g are configured to extend from the end part of the second plate part 5f on the opposite side to the spring pressing part 5b toward the side of the other end part of the outer periphery holding part 5a (the opposite side to the side in which the first plate part 5e is formed), the extending direction is inclined relative to a direction parallel to the center axis of the ferrule 11 to the side of the first plate part 5e. A pair of the arm parts 5g are parallel to each other and are formed so as to sandwich the outer periphery holding part 5a in the radial direction of the ferrule 11. Namely, a pair of the arm parts 5g is configured to extend from both end parts of the second plate part 5f of a rectangular shape in the short side direction obliquely relative to the axis direction of the outer periphery holding part 5a.

In other words, the side of the first plate part 5e is located in the upper side and the side of the second plate part 5f is located in the lower side relative to the spring pressing part 5b, and further the side of one end part of the outer periphery holding part 5a (the side in which the first plate part 5e is formed) is located in the right side and the opposite side thereto is located in the left side, and when the ferrule fixing member 5 is viewed from the arrangement direction of a pair of the arm parts 5g, a pair of the arm parts 5g cross obliquely relative to the outer periphery holding part 5a from the lower right toward the upper left, and the claw part 5d is located in the upper side than the outer periphery holding part 5a.

Figure 5A:
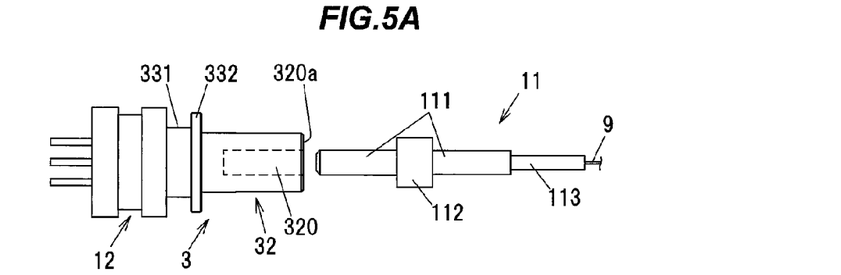
FIG. 5A is an explanatory view in a state before the ferrule is inserted into the optical subassembly.
Figure 5B:
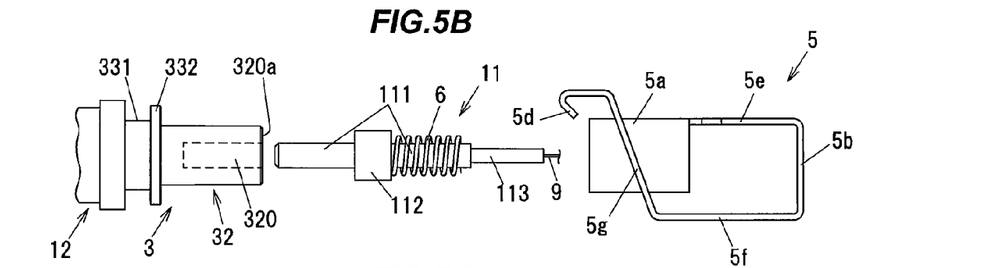
FIG. 5B is an explanatory view in a state that a coil spring is mounted in the ferrule.
Figure 5C:
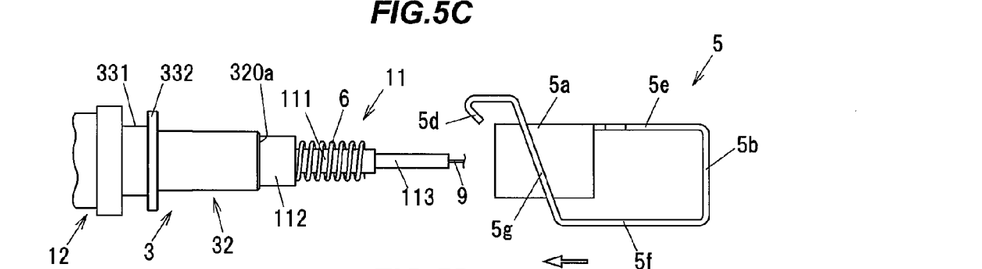
FIG. 5C is an explanatory view in a state just before the ferrule fixing member is mounted.
Figure 5D:
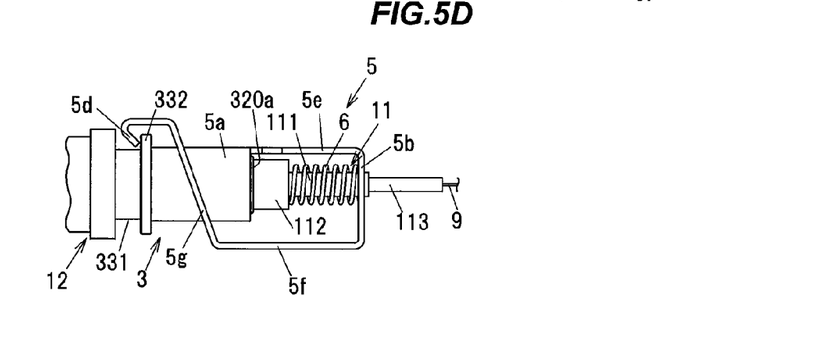
FIG. 5D is an explanatory view in a state after the ferrule fixing member is mounted.

FIGS. 5A to 5D are explanatory views schematically showing a process for fixing the ferrule 11 to the optical subassembly 12 by the ferrule fixing member 5, wherein FIG. 5A is an explanatory view in a state before the ferrule 11 is inserted into the optical subassembly 12, FIG. 5B is an explanatory view in a state that the coil spring 6 is mounted in the ferrule 11, FIG. 5C is an explanatory view in a state that the ferrule 11 is inserted into the ferrule holding part 32, and FIG. 5D is an explanatory view in a state that the ferrule fixing member 5 is mounted.

The step of fixing the ferrule 11 to the optical subassembly 12 includes an insertion step of inserting the ferrule 11 into the optical subassembly 12 and a fixing step of mounting the ferrule fixing member 5 in the optical subassembly 12 so as to fix the ferrule 11 to the optical subassembly 12.

As shown in FIG. 5A, in the insertion step, the ferrule 11 and the optical subassembly 12 are prepared, and subsequently as shown in FIG. 5B, the coil spring 6 is mounted on the outer periphery side of the capillary 111 and the rubber boot 113 of the ferrule 11.

As shown in FIG. 5C, in the starting stage of the fixing step, the capillary 111 of the ferrule 11 is inserted into the holding hole 320 of the ferrule holding part 32 in the holding member 3 of the optical subassembly 12 from the side of the opening end surface 320a thereof. Next, the ferrule fixing member 5 is moved toward the ferrule 11 and the ferrule holding part 32 is passed through the inside of the outer periphery holding part 5a so as to allow the outer periphery holding part 5a to be arranged in the position that surrounds the ferrule holding part 32. In this step, when the end surface of the capillary 111 of the ferrule 11 in the axis direction comes into contact with the spring pressing part 5b, the ferrule fixing member 5 is regulated in the movement toward the side of the ferrule 11. Namely, the ferrule passing hole 5h is formed to have a diameter smaller than the capillary 111 of the ferrule 11 and larger than the rubber boot 113 of the ferrule 11.

As shown in FIG. 5D, in the final stage of the fixing step, the claw part 5d of the ferrule fixing member 5 is locked with the brim part 332 of the locking part 33 the while the coil spring 6 is compressed by the inner surface of the spring pressing part 5b. Thereby, the ferrule 11 is fixed to the optical subassembly 12.

As mentioned above, when the claw part 5d of the ferrule fixing member 5 is locked with the locking part 33 of the holding member 3, the coil spring 6 is compressed along the longitudinal direction of the ferrule 11, thus the ferrule 11 can be held by the holding member 3 by resilient force of the coil spring 6 compressed.

Figure 6:
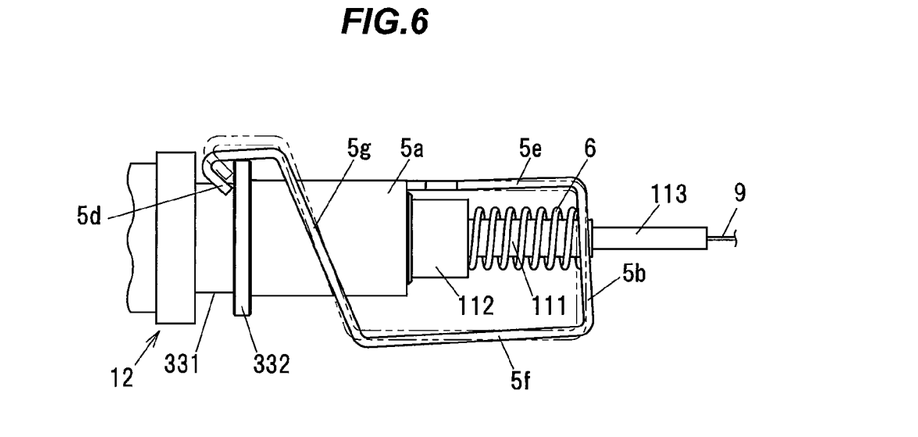
FIG. 6 is an explanatory view in a state that the ferrule fixing member is deformed when being mounted.

FIG. 6 is an explanatory view schematically showing a direction in which the ferrule fixing member 5 is displaced by the resilient force (reaction force) of the coil spring 6 in a state that the ferrule 11 is fixed by the ferrule fixing member 5 (in a locking state). The resilient force of the coil spring 6 makes the spring pressing part 5b be inclined to the base end part in the side of the first plate part 5e such that the end part of the side of the second plate part 5f is spaced apart from the flange part 112 of the ferrule 11. Then, a pair of the arm parts 5g receive a force of the direction displacing to the side of the second plate part 5f (the lower side in FIG. 6) according to the inclination of the spring pressing part 5b. Thereby, the ferrule fixing member 5 receives a force from the coil spring 6, the force deforming from a state shown by the two-dot chain line to a state shown by the solid line in FIG. 6. The direction of the deformation is a direction that the claw part 5d is bitten into the groove part 331 of the locking part 33, thus there is no case that the locking state of the ferrule fixing member 5 is released by the resilient force of the coil spring 6.

Figure 7A:
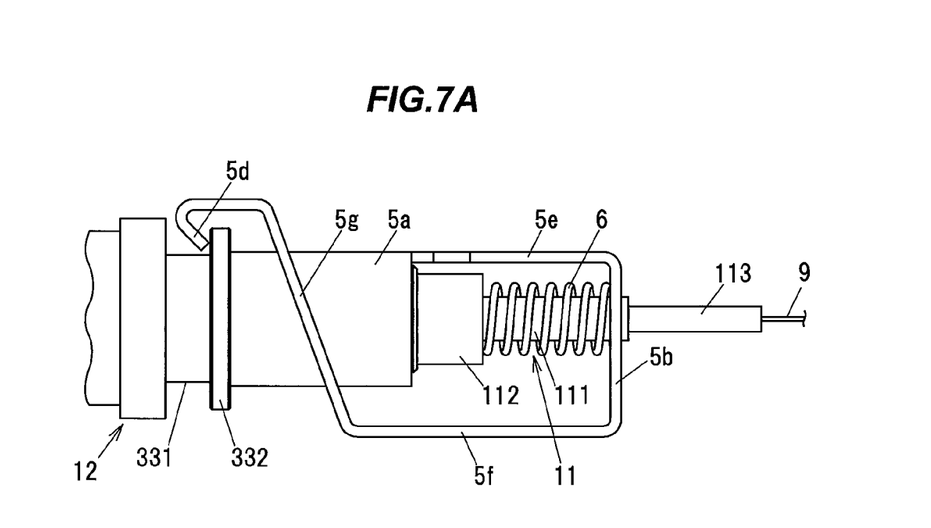
FIG. 7A is an explanatory view when the ferrule fixing member is mounted.
Figure 7B:
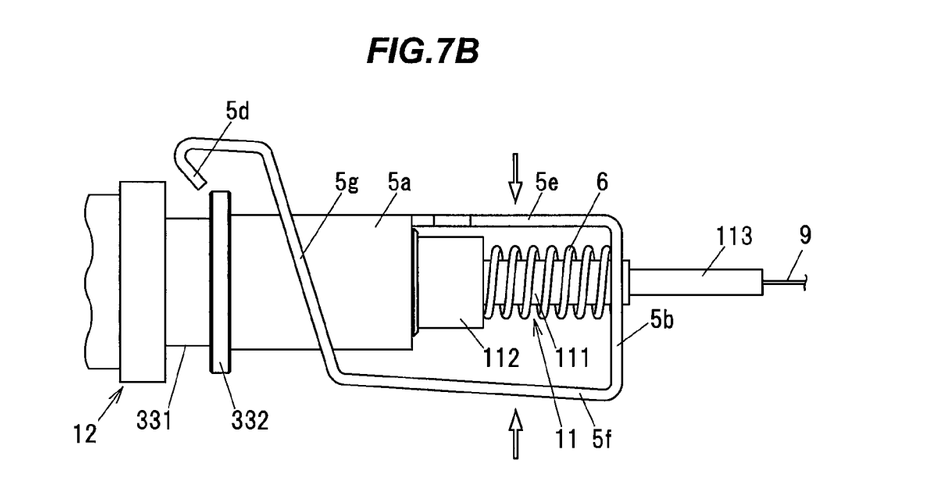
FIG. 7B is an explanatory view when the removal operation is carried out.

FIGS. 7A and 7B are explanatory views schematically showing an operation carried out when a user releases the locking state of the ferrule fixing member 5, wherein FIG. 7A shows the ferrule 11 and the optical subassembly 12 that are in the locking state and FIG. 7B shows the ferrule 11 and the optical subassembly 12 that are in the unlocking state respectively.

The claw part 5d is released from the locking state with the locking part 33 of the optical subassembly 12 by making the first plate part 5e and the second plate part 5f close to each other. Namely, in the case that the ferrule 11 and the optical subassembly 12 are in the locking state, the first plate part 5e and the second plate part 5f are pressed in the direction of the arrow, the claw part 5d is displaced toward the side of the outer periphery of the groove part 331 of the locking part 33 so as to be released from the locking with the brim part 332, thus the fixture of the ferrule 11 and the optical subassembly 12 can be released.

(Operation and Effect of the Embodiment)

According to the embodiment explained above, the following operation and effect can be obtained.

(1) The coil spring 6 is arranged between the first plate part 5e and the second plate part 5f, thus the coil spring 6 and the first plate part 5e and the second plate part 5f can be arranged so as to be overlapped with each other in the radial direction of the ferrule 11. Thereby, the length of the ferrule fixing member 5 in the axis direction of the ferrule 11 can be shortened so that downsizing can be achieved. Namely, the first plate part 5e and the second plate part 5f are elastically deformed with the base end part and the end part of the spring pressing part 5b as a fulcrum so as to approach each other when the locking state is released, and the claw part 5d is formed in a location that sandwiches the first plate part 5e and the second plate part 5f between the claw part 5d and the spring pressing part 5b in the longitudinal direction of the ferrule 11, thus the whole length of the ferrule fixing member 5 can be shortened in comparison with, for example, the above-mentioned configuration that the finger lever is mounted in the rear end side of the spring pressing part 5b (the opposite side to the claw part 5d), like the conventional optical transceiver.

(2) Even if dimensions of each component are not as designed due to dimension error of the ferrule fixing member 5 formed by bending of a plate-like material, an influence of the dimension error on the pressing load of the ferrule 11 is mostly absorbed by the deformation volume of the coil spring 6, thus a pressing amount of the ferrule 11 to the holding member 3 can be maintained at an approximately constant value.

(3) The ferrule passing hole 5h is formed in the spring pressing part 5b, the optical fiber 9 passes through the optical fiber passing slit 5c when assembled, and the capillary 111, the rubber boot 113 and the optical fiber 9 are inserted into the ferrule passing hole 5h. Thereby, the assembly work can be easily carried out, and simultaneously the coil spring 6 is pressed by the peripheral part of the ferrule passing hole 5h, thereby the ferrule 11 can be stably pressed to the holding member 3. In addition, the end part of the ferrule 11 (a part of the capillary 111) that becomes an axis of the coil spring 6 projects from the ferrule passing hole 5h, thereby the ferrule 11 can be regulated in the movement of the radial direction. The ferrule 11 is regulated in the movement of the radial direction, thereby the coil spring 6 can be also regulated in the movement of the radial direction of the ferrule 11, thus variation of the pressing load of the coil spring 6 to the ferrule 11 due to a positional displacement of the radial direction of the ferrule 11 can be prevented.

(4) A pair of the arm parts 5g are configured such that the extending direction is inclined relative to a direction parallel to the center axis of the ferrule 11 to the side of the first plate part 5e, thus the locking state of the claw part 5d can be released by making the first plate part 5e and the second plate part 5f close to each other, so that the ferrule fixing member 5 can be easily removed. In addition, as mentioned above, the reaction force of the coil spring 6 acts in a direction that the claw part 5d is bitten into the groove part 331 of the locking part 33, thus unintended separation of the ferrule fixing member 5 due to interference or the like with the peripheral members can be prevented.

(5) The outer periphery holding part 5a houses at least a part of the ferrule holding part 32, thus the relative position relation between the holding member 3 and the ferrule fixing member 5 can be appropriately maintained.

(6) The claw part 5d is configured to connect the end parts of a pair of the arm parts 5g to each other, thus the part in which the ferrule fixing member 5 is locked with the locking part 33 can be restricted to one part, thus in comparison with a configuration that, for example, the claw part as a locked part is mounted in each of a pair of the arm parts 5g, the ferrule fixing member 5 can be easily removed.

(Summary of the Embodiment)

Next, the technical idea grasped from the above-explained embodiments will be described by utilizing the reference numerals and the like in the embodiments. However, the respective reference numerals and the like in the following description do not limit the constitutional components in the scope of the claim to the members concretely shown in the embodiments.

[1] A ferrule fixing member (5) configured to fix a ferrule (11) for holding an optical fiber (9) to a holding member (3) with a holding hole (320) into which the ferrule (11) is inserted, comprising a first plate part (5e) and a second plate part (5f) configured to face each other while sandwiching a resilient member (6) arranged on an outer periphery of the ferrule (11) in a radial direction thereof, a pressing part (5b) configured to press the resilient member (6) such that the ferrule (11) is pressed against a bottom side of the holding hole (320) by a resilient force of the resilient member (6), a locked part (5d) configured to be engaged with a locking part (33) formed in the holding member (3) and an extending part (5g) configured to extend from the second plate part (5f) to the locked part (5d), wherein the locking of the locked part (5d) and the locking part (33) is released by moving the first plate part (5e) and the second plate part (5f) close to each other.

[2] The ferrule fixing member (5) according to [1], wherein the pressing part (5b) has an insertion hole (5h) into which the ferrule (11) is inserted, and wherein the pressing part (5b) is formed so as to connect both end parts of the first plate part (5e) and the second plate part (5f), the both end parts being opposite to the holding hole (320) in a longitudinal direction of the ferrule (11).

[3] The ferrule fixing member (5) according to [2], further comprising a cylindrical part (5a) configured to house at least a part of the holding member (3), wherein the first plate part (5e) is formed between one end part of the cylindrical part (5a) and the pressing part (5b).

[4] The ferrule fixing member (5) according to [3], wherein the extending part (5g) extends from an end part of the second plate part (5f) opposite to the pressing part (5b) to the side of another end part of the cylindrical part (5a), and the extending direction is inclined toward the side of the first plate part (5e) relative to a direction parallel to the center axis of the ferrule (11).

[5] The ferrule fixing member (5) according to any one of [1] to [4], wherein the extending part (5g) comprises a pair of arm parts (5g) sandwiching the cylindrical part (5a), and the locked part (5d) is configured to connect both end parts of a pair of arm parts (5g) to each other.

[6] A ferrule holding structure, comprising the ferrule fixing member (5) according to any one of [1] to [5] and the resilient member (6), wherein the resilient member (6) is compressed along the longitudinal direction of the ferrule (11) when the locked part (5d) of the ferrule fixing member (5) is engaged with the locking part (33) of the holding member (3), and the ferrule (11) is held by the holding member (3) by the resilient force of the resilient member (6) compressed.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

For example, in the above-mentioned embodiment, the holding member 3 integrally includes the module housing part 31, the ferrule holding part 32 and the locking part 33, but not limited to this, the holding member 3 can be also constituted by assembling components formed from different members.

In addition, in the above-mentioned embodiment, the outer periphery holding part 5a of the ferrule fixing member 5 is formed in a rectangular shape in cross section, but not limited to this.

In addition, in the above-mentioned embodiment, a configuration that the Receiver Optical Sub-Assembly (ROSA) is used as the optical subassembly 12 is explained, but not limited to this, the Transmitter Optical Sub-Assembly (TOSA) can be also used.

In addition, similarly to the above, there is no particular limitation with regard to a configuration of the optical module 2.

What is claimed is:

1. A ferrule fixing member for fixing a ferrule to hold an optical fiber to a holding member with a holding hole into which the ferrule is inserted, comprising:
   a first plate part and a second plate part configured to face each other while sandwiching a resilient member arranged on an outer periphery of the ferrule in a radial direction thereof;
   a pressing part configured to press the resilient member such that the ferrule is pressed against a bottom side of the holding hole by a resilient force of the resilient member; a locked part configured to be engaged with a locking part formed in the holding member; and an extending part configured to extend from the second plate part to the locked part, wherein the locking of the locked part and the locking part is released by moving the first plate part and the second plate part close to each other
   wherein the pressing part comprises an insertion hole into which the ferrule is inserted, and wherein the pressing part is formed so as to connect both end parts of the first plate part and the second plate part, the both end parts being opposite to the holding hole in a longitudinal direction of the ferrule.

2. The ferrule fixing member according to claim 1, further comprising a cylindrical part configured to house at least a part of the holding member; wherein the first plate part is formed between one end part of the cylindrical part and the pressing part.

3. The ferrule fixing member according to claim 2, wherein the extending part extends from an end part of the second plate part opposite to the pressing part to the side of another end part of the cylindrical part, and wherein the extending direction is inclined toward the side of the first plate part relative to a direction parallel to the center axis of the ferrule.

4. The ferrule fixing member according to claim 2, wherein the extending part comprises a pair of arm parts sandwiching the cylindrical part, and the locked part is configured to connect both end parts of the pair of arm parts to each other.

5. A ferrule fixing member for fixing a ferrule to hold an optical fiber to a holding member with a holding hole into which the ferrule is inserted, comprising:
   a first plate part and a second plate part configured to face each other while sandwiching a resilient member arranged on an outer periphery of the ferrule in a radial direction thereof;
   a pressing part configured to press the resilient member such that the ferrule is pressed against a bottom side of the holding hole by a resilient force of the resilient member; a locked part configured to be engaged with a locking part formed in the holding member; and an extending part configured to extend from the second plate part to the locked part, wherein the locking of the locked part and the locking part is released by moving the first plate part and the second plate part close to each other
   wherein the resilient member is compressed along the longitudinal direction of the ferrule when the locked part of the ferrule fixing member is engaged with the locking part of the holding member, and the ferrule is held by the holding member by the resilient force of the resilient member compressed.

* * * * *